United States Patent
Xu et al.

(10) Patent No.: US 8,675,375 B2
(45) Date of Patent: Mar. 18, 2014

(54) SYSTEM AND METHOD FOR INPUT VOLTAGE TRANSIENT RESPONSE CONTROL

(75) Inventors: Shanguang Xu, Plano, TX (US); Zhong Ye, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 207 days.

(21) Appl. No.: 13/329,211

(22) Filed: Dec. 16, 2011

(65) Prior Publication Data

US 2013/0155726 A1 Jun. 20, 2013

(51) Int. Cl.
*H02M 3/335* (2006.01)

(52) U.S. Cl.
USPC ........................................ 363/21.06

(58) Field of Classification Search
USPC .......................................... 363/17, 21.06, 89
See application file for complete search history.

(56) References Cited

U.S. PATENT DOCUMENTS

| | | | |
|---|---|---|---|
| 6,618,274 B2* | 9/2003 | Boylan et al. | 363/21.06 |
| 6,788,553 B1* | 9/2004 | Jin et al. | 363/21.06 |
| 6,888,728 B2* | 5/2005 | Takagi et al. | 363/21.06 |
| 7,289,338 B2* | 10/2007 | Kawasaki et al. | 363/16 |
| 2002/0191422 A1* | 12/2002 | Takagi et al. | 363/21.06 |
| 2009/0086512 A1* | 4/2009 | Fahlenkamp et al. | 363/21.06 |
| 2011/0317452 A1* | 12/2011 | Anguelov et al. | 363/21.02 |

* cited by examiner

*Primary Examiner* — Jue Zhang
(74) *Attorney, Agent, or Firm* — William B. Kempler; Wade J. Brady, III; Frederick J. Telecky, Jr.

(57) ABSTRACT

The present invention provides a DC/DC converter for use with a DC input signal. The DC/DC converter includes a control signal generator, a primary and a secondary side, a voltage generating portion, a threshold voltage providing portion and a feedback signal generator. The control signal generator can control the primary side and the secondary side. The voltage generating portion can generate a surge voltage based a control signal from the control signal generator. The threshold voltage providing portion can generate a threshold voltage. The feedback signal generator can generate a feedback signal based on the surge voltage and the threshold voltage. The control signal generator can further modify control of one of the primary and secondary sides based on the feedback signal.

20 Claims, 11 Drawing Sheets

SYSTEM AND METHOD FOR INPUT VOLTAGE TRANSIENT RESPONSE CONTROL

BACKGROUND

The present invention relates to voltage converters, and more particularly DC/DC full bridge converters.

DC/DC converters are electronic devices typically used in power supply applications for personal computers, cell phones, telecommunication equipment, etc. A DC/DC converter receives unregulated DC voltage as input. It outputs regulated DC voltage with a magnitude different than the input DC voltage. A DC/DC converter changes the output voltage magnitude by temporarily converting input DC electrical power to alternate current (AC) electrical power, then the required voltage magnitude can be obtained through a step-up or a step-down operation, finally the AC electrical power is converted back to DC electrical power. DC/DC converters can be built with different types of circuits, including half bridge and full bridge. The topologies of the different types of circuits are well-known.

FIGS. 1A-B illustrates a conventional DC/DC full bridge converter 100. FIG. 1A illustrates a conventional DC/DC full bridge converter 100 during a first operational state. FIG. 1B illustrates a conventional DC/DC full bridge converter 100 during a second operational state.

As illustrated in FIG. 1A, conventional DC/DC full bridge converter 100 includes a primary side 102, a secondary side 104, a transformer 106, a DC input signal provider 108 and a control signal generator 110. Transformer 106 includes a primary side winding 112 and a secondary side winding 114. Primary side 102 includes primary side switches 116, 118, 120 and 122 and primary side winding 112. Secondary side 104 includes secondary side winding 118, an inductor 124, secondary side switches 126 and 128, a capacitor 130 and a resistive load 132.

DC input signal provider 108 is arranged to provide an input signal 134 to primary side 102. Control signal generator 110 is arranged to provide primary side control signals 136, 138, 140 and 142 to primary side switches 116, 118, 120, 122 and secondary side control signals 144 and 146 to secondary side switches 126 and 128, respectively. Primary side winding 112 is connected to primary side switches 116, 118, 120 and 122. Transformer 106 is situated between primary side 102 and secondary side 104. Secondary side winding 114 is connected in series with secondary side switches 126, 128. Inductor 124 is connected to secondary side winding 114. Capacitor 130 is connected in series with inductor 120. Resistive load 132 is connected in parallel to capacitor 130.

DC input signal provider 108 is a voltage source that provides input signal 134. Primary side switches 116, 118, 120 and 122 and secondary side switches 126 and 128 may be any known electrical switching device, non-limiting examples of which include field effect transistors. Transformer 106 is any known system or device that can generate a current from primary side 102 to secondary side 104. Inductor 124 and capacitor 130 together act as a filter for smoothing an output voltage 148 across resistive load 132. Secondary side winding 114 produces a center-tap voltage 150.

Resistive load 132 may be any device or system that is to be driven. Control signal generator 110 is control circuit for supplying pulsed control signals. Primary side control signals 136, 138, 140 and 142 and secondary side control signals 144 and 146 are pulsed control signals generated by control signal generator 110. Primary side control signals 136, 138, 140 and 142 and secondary side control signals 144 and 146 are pulse-width modulated control signals.

In operation through the first and second operational states, conventional DC/DC full bridge converter 100 receives input signal 134 in the form of direct current (DC) as input. Input signal 134 has an associated voltage level that is too high or too low and not suitable to drive resistive load 132. Conventional DC/DC full bridge converter 100 produces output voltage 148, which has a proper voltage level to drive resistive load 132 while maintaining direct current.

During the first operational state as shown in FIG. 1A, control signal generator 110 transmits primary side control signals 136, 142, and secondary side control signal 144 to turn on primary side switches 116, 122, and secondary side switch 126 respectively. At the same time, control signal generator 110 transmits primary side control signals 138, 140, and secondary side control signal 146 to turn off primary side switches 118, 120, and secondary side switch 128 respectively.

The switching on of primary side switches 116 and 122 allows input signal 134 to travel through them as current, thus applying input signal 134 as voltage across primary side winding 112 and inducing a magnetic field 152. Correspondingly, a positive magnetic field 154 is induced in secondary side winding 114. Positive magnetic field 154 generates a current 156 that travels through secondary side switch 126 to produce a first output voltage 158 at the end of the first operational state.

During the second operational state as shown in FIG. 1B, control signal generator 110 transmits primary side control signals 136, 142, and secondary side control signal 144 to turn off primary side switches 116, 122, and secondary side switch 126 respectively. At the same time, control signal generator 110 transmits primary side control signals 138, 140, and secondary side control signal 146 to turn on primary side switches 118, 120, and secondary side switch 128 respectively.

The switching on of primary side switches 118 and 120 allows input signal 134 to travel through them as current, thus applying input signal 134 as voltage across primary side winding 112 and inducing a magnetic field 160 that has an opposite direction as magnetic field 152. Correspondingly, a negative magnetic field 162 is induced in secondary side winding 114. Negative magnetic field 162 generates a current 164 that travels through secondary side switch 128 to produce a second output voltage 166 at the end of the second operational state.

In the end, first output voltage 158 and second output voltage 166 combine to produce output voltage 148. Output voltage 148 has an associated voltage level that is appropriate to drive resistive load 132, but lower than the associated voltage magnitude of input signal 134. This will be further described with additional reference in FIGS. 2-4 below.

FIG. 2 is a timing diagram illustrating the state of primary side control signals 136, 138, 140 and 142 and secondary side control signals 144 and 146 of conventional DC/DC converter 100 during a first and a second operational state.

The figure includes examples of primary side control signals 136, 138, 140 and 142 and secondary side control signals 144 and 146.

Primary side control signal 136 includes a period 202 and a partial period 204. Period 202 includes an on state voltage portion 206 from a time $t_2$ to a time $t_3$ and an off state voltage portion 208 from time $t_3$ to a time $t_6$. Partial period 204 includes an on state voltage portion 210 from time $t_6$ to a time $t_7$ and an off state voltage portion 212 from time $t_7$ forward.

Primary side control signal 138 includes a partial period 214 and a period 216. Partial period 214 includes an on state voltage portion 218 from a time $t_0$ to a time $t_1$ and an off state voltage portion 220 from time $t_1$ to time $t_4$. Period 216 includes an on state voltage portion 222 from time $t_4$ to a time $t_5$ and an off state voltage portion 224 from time $t_5$ to a time $t_S$.

Primary side control signal 142 includes a period 226 and a partial period 228. Period 226 includes an on state voltage portion 230 from time $t_2$ to time $t_3$ and an off state voltage portion 232 from time $t_3$ to time $t_6$. Partial period 228 includes an on state voltage portion 234 from time $t_6$ to time $t_7$ and an off state voltage portion 236 from time $t_7$ forward.

Primary side control signal 140 includes a partial period 238 and a period 240. Partial period 238 includes an on state voltage portion 242 from time $t_0$ to time $t_1$ and an off state voltage portion 244 from time $t_3$ to time $t_6$. Period 240 includes an on state voltage portion 246 from time $t_4$ to time $t_5$ and an off state voltage portion 248 from time $t_5$ to a time $t_S$.

Secondary side control signal 146 includes a partial period 250 and a period 252. Partial period 250 includes an on state voltage portion 254 from time $t_0$ to time $t_2$ and an off state voltage portion 256 from time $t_2$ to time $t_3$. Period 252 includes an on state voltage portion 258 from time $t_3$ to time $t_6$ and an off state voltage portion 260 from time $t_6$ to time $t_7$.

Secondary side control signal 144 includes a partial period 262 and a period 264. Partial period 262 includes an on state voltage portion 266 from time $t_0$ to time $t_4$ and an off state voltage portion 268 from time $t_4$ to time $t_5$. Period 264 includes an on state voltage portion 270 from time $t_5$ to time $t_S$ and an off state voltage portion 272 from time $t_S$ to a time $t_9$.

In operation, primary side control signals 136, 142, and secondary side control signal 144 have switching frequencies such that primary side switches 116, 122, and secondary side switch 126 are on together. In a non-limiting example, on state voltage portions 206, 230, 266 overlap from time $t_2$ to time $t_3$, similarly, on state voltage portions 210, 234, and 270 overlap from time $t_6$ to time $t_7$. As a result, primary side switches 116, 122, and secondary side switch 126 are on together from time $t_2$ to time $t_3$ and time $t_6$ to time $t_7$.

Primary side control signals 136, 142, and secondary side control signal 144 operate complementarily to primary side control signals 138, 140, and secondary side control signal 146, so that primary side switches 116, 122, and secondary side switch 126 are on while primary side switches 118, 120, and secondary side switch 128 are off, and vice versa. In a non-limiting example, on state voltage portions 206, 230, 266 overlap with off state voltage portions 220, 244, and 256 from time $t_2$ to time $t_3$, thus primary side switches 116, 122, and secondary side switch 126 are on, while primary side switches 118, 120, and secondary side switch 128 are off. From time $t_4$ to time $t_5$, on state voltage portions 222, 246, 258 overlap with off state voltage portions 208, 232, and 268, so that primary side switches 118, 120, and secondary side switch 128 are on, while primary side switches 116, 122, and secondary side switch 126 are off.

A problem associated with conventional DC/DC full bridge converter 100 in FIGS. 1A and 1B is large output voltage overshoot, where there is a huge increase in voltage level of output voltage 148 when input signal 134 is increased rapidly. A large output voltage overshoot causes damages to resistive load 132 or downstream electronic load that is driven by output voltage 148. This will be described in further detail with reference to FIGS. 3 and 4.

FIG. 3 is a timing diagram illustrating an output voltage overshoot scenario of conventional DC/DC converter 100.

The figure includes examples of output voltage 148, input signal 134, and center-tap voltage 150.

Output voltage 148 includes a stable portion 302 from a time $T_0$ to a time $T_4$ and an unstable portion 304 from time $T_4$ forward. Input signal 134 includes a low portion 306 from time $T_0$ to time $T_4$ and a high portion 308 from time $T_4$ forward.

Center-tap voltage 150 includes a pulse 310, a pulse 312, and a pulse 314. Pulse 310 includes an on state voltage portion 316 from a time $T_1$ to a time $T_2$ and an off state voltage portion 318 from time $T_2$ to a time $T_3$, and an amplitude 320. Pulse 312 includes an on state voltage portion 322 from time $T_3$ to a time $t_5$ and an off state voltage portion 324 from time $T_5$ to a time $T_6$, and an amplitude 326. Amplitude 326 includes amplitude 320 and an increased portion 328. Pulse 314 includes an on state voltage portion 330 from time $T_6$ to a time $T_7$, off state voltage portion 332 from time $T_7$ to a time $T_S$, and amplitude 326.

In operation, when input signal 134 experiences a rapid increase in voltage level, it transitions from low portion 306 to high portion 308 at time $T_4$. As a result, output voltage 148 will experience an overshoot in voltage level as shown by the change in the flat line with a zero slope in stable portion 302 to the straight line with a positive slope in unstable portion 304. Center-tap voltage 150 will also experience an increase in voltage level. Prior to time $T_4$, the voltage level of center-tap voltage 150 is represented by amplitude 320 of pulse 310. At time $T_4$, the voltage level of center-tap voltage 150 is increased by an amount equal to increased portion 328, so that amplitude 326 of pulse 312 is equal to the sum of amplitude 320 and increased portion 328. From time $T_4$ forward, center-tap voltage 150 has voltage level equal to amplitude 326, as shown in pulses 312 and 314.

As noted in FIG. 3, input signal 134 has a rapid increase in voltage level when transitioning from low portion 306 to high portion 308 at time $T_4$, a goal of conventional DC/DC converter 100 is to maintain a constant output voltage 148 in the face of changing input signal 134. However, as noted in FIG. 3, as a result of the rapid increase in voltage level of input signal 134 at time $T_4$, output voltage 148 is increased as noted by unstable portion 304. This increase may negatively affect, or worse damage, resistive load 132 that is to be driven by output voltage 148. The instability, as noted by unstable portion 304, is directly caused by the overshoot of a increase voltage in the DC-AC-DC conversion within conventional DC/DC converter 100. This will be further described with reference to FIG. 4.

FIG. 4 is a wave diagram illustrating an output voltage overshoot scenario an output voltage overshoot scenario of conventional DC/DC converter 100;

The figure includes examples of input signal 134 and output voltage 148.

Input signal 134 includes a low portion 402 from a time a to a time b, a surge portion 404 from time b to a time c, and a high portion 406 from time c forward. Output voltage includes a low portion 408 from time a to time b, an overshoot portion 410 from time b to a time d and a recovery portion 412 from time d forward.

In a non-limiting example, input signal 134 has a voltage value of 44 volts in low portion 402 and output voltage 148 has a voltage value of 12 volts in low portion 408. When input signal 134 increases rapidly from 44 volts in low portion 402 to 56 volts in high portion 406 through surge portion 404, output voltage 148 experiences an overshoot of 2.32 volts in overshoot portion 410 from time b to time d, then gradually decreases back to 12 volts in recovery portion 412 from time d forward. The voltage overshoot of 2.32 volts experienced by output voltage 148 causes damages or malfunctions to electrical equipments connected to output voltage 148.

What is needed is a DC/DC full bridge converter that reduces the output voltage overshoot when input voltage is increased rapidly.

BRIEF SUMMARY

The present invention provides a DC/DC converter for use with a DC input signal. The DC/DC converter includes a control signal generator, a primary side winding; a first primary side switch, a second primary side switch, a secondary side winding, an output load, a first secondary side switch, a second secondary side switch, a voltage generating portion, a threshold voltage providing portion and a feedback signal generator. The control signal generator can generate a first primary side control signal, a second primary side control signal, a first secondary side control signal, a second secondary side control signal and a third secondary side control signal. The first primary side switch can pass, based on the first primary side control signal, the DC input signal through the primary side winding in a positive direction to generate a first magnetic field. The second primary side switch can pass, based on the second primary side control signal, the DC input signal through the primary side winding in a negative direction to generate a second magnetic field. The secondary side winding can generate a first current in the positive direction based on the first magnetic field and can generate a second current in the negative direction based on the second magnetic field. The first secondary side switch can pass the first current to the output load based on the first secondary side control signal. The second secondary side switch can pass the second current to the output load based on the second secondary side control signal. The voltage generating portion can receive the first current and the second current and can generate a surge voltage based on the third secondary side control signal. The threshold voltage providing portion can generate a threshold voltage. The feedback signal generator can generate a feedback signal based on the surge voltage and the threshold voltage. The control signal generator can further modify one of the first primary side control signal, the second primary side control signal, the first secondary side control signal, the second secondary side control signal and the third secondary side control signal based on the feedback signal.

Additional advantages and novel features of the invention are set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF SUMMARY OF THE DRAWINGS

The accompanying drawings, which are incorporated in and form a part of the specification, illustrate an exemplary embodiment of the present invention and, together with the description, serve to explain the principles of the invention. In the drawings.

DETAILED DESCRIPTION

In accordance with an aspect of the present invention, a voltage sensing circuit is used on the secondary side of a DC/DC full bridge converter to prevent a large output voltage overshoot when there is a rapid increase in input voltage. A comparator is used to compare the amount of output voltage overshoot as sensed by the voltage sensing circuit to a predetermined acceptable threshold of output voltage overshoot.

When the amount of output voltage overshoot is above the predetermined threshold, a feedback system modifies the control signals to the switches on the primary and/or secondary side of the DC/DC full bridge converter to decrease the output voltage overshoot to be below the predetermined threshold, thus preventing, or limiting, any potential damages caused by the output voltage overshoot to a load driven by the output voltage.

Example embodiments in accordance with aspects of the present invention will now be described with reference to FIGS. 5A-9.

Figure 1A:
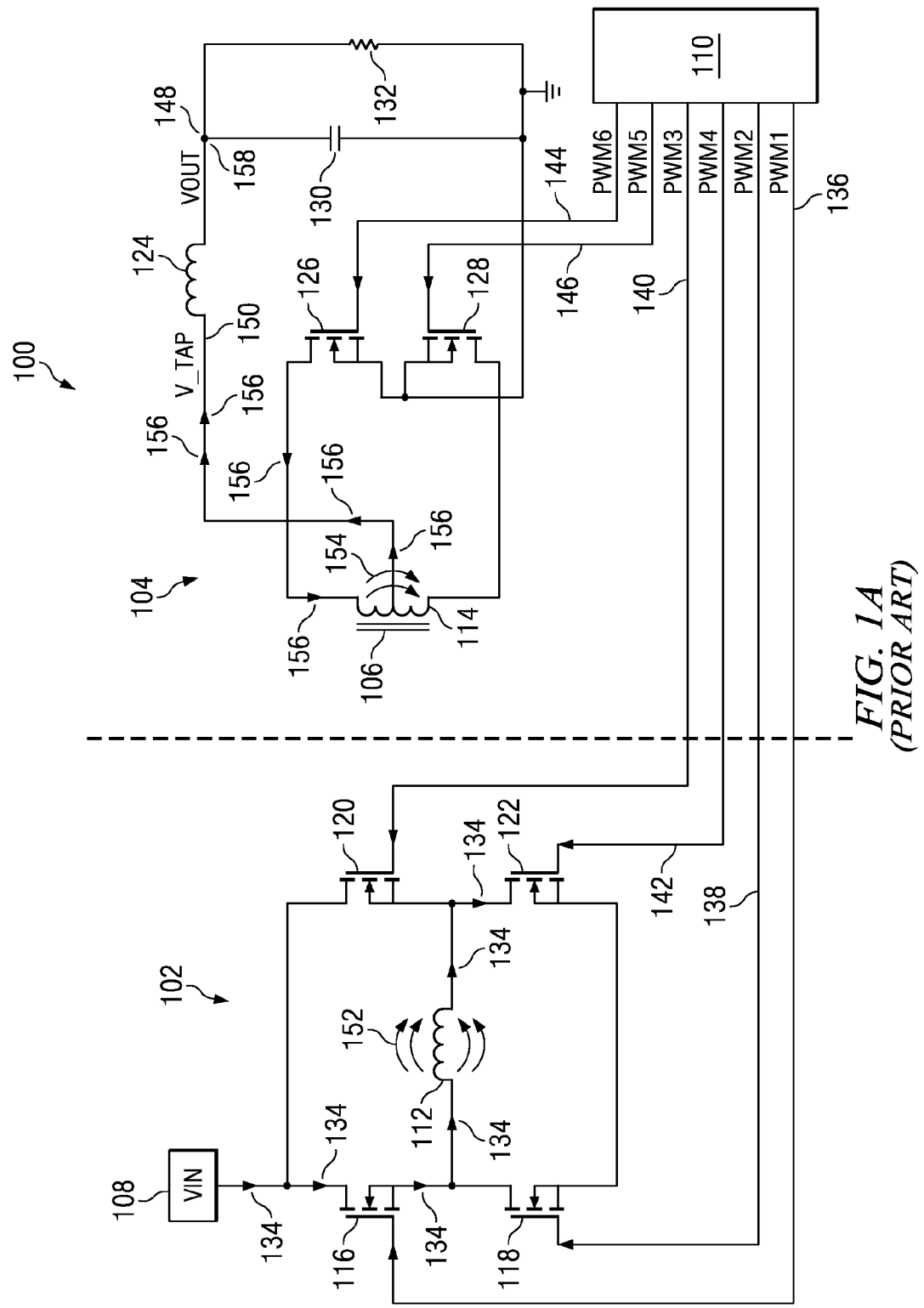
FIG. 1A illustrates a conventional DC/DC full bridge converter during a first operational state.
Figure 1B:
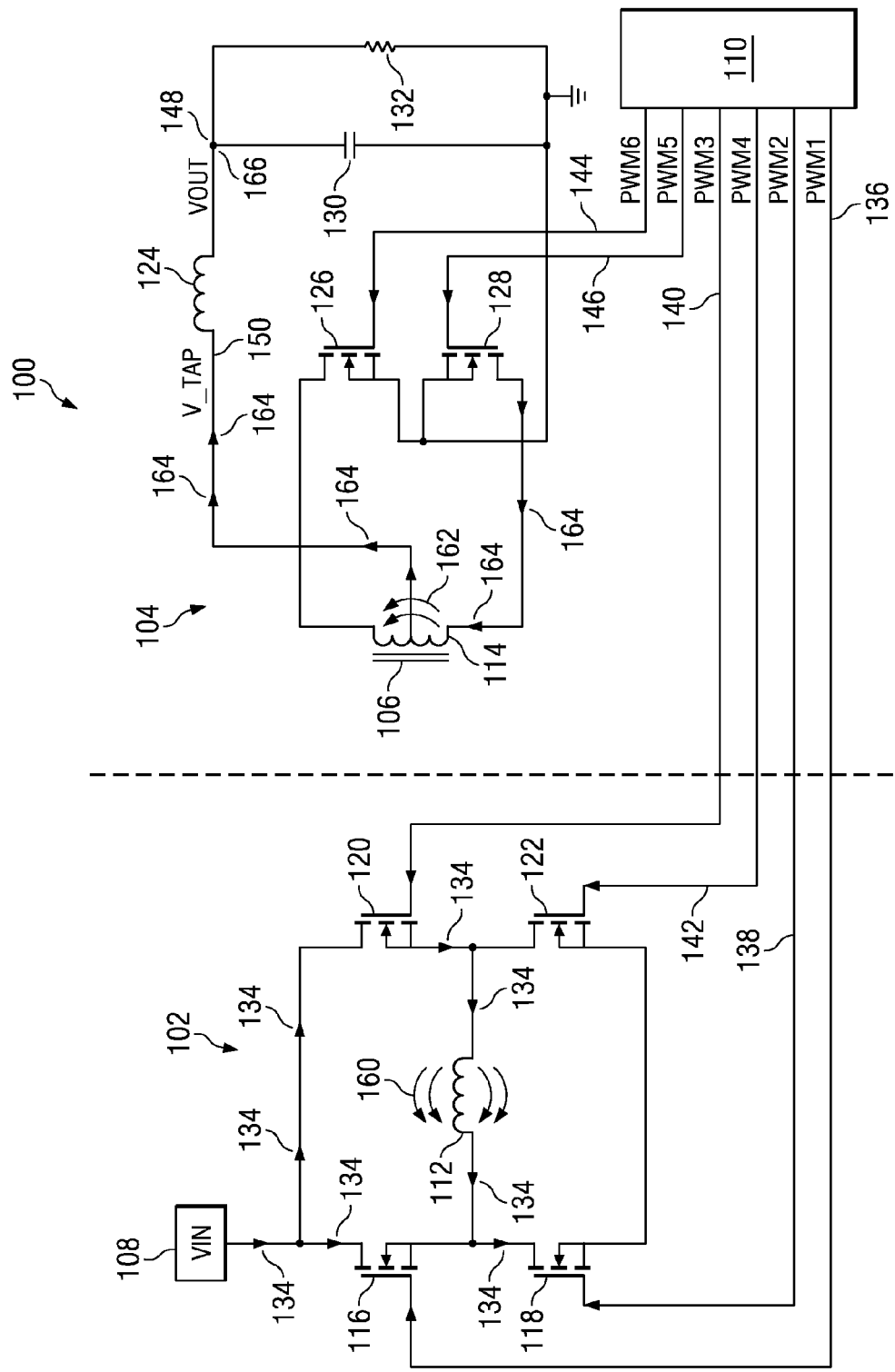
FIG. 1B illustrates the conventional DC/DC full bridge converter of FIG. 1A, during a second operational state.
Figure 2:
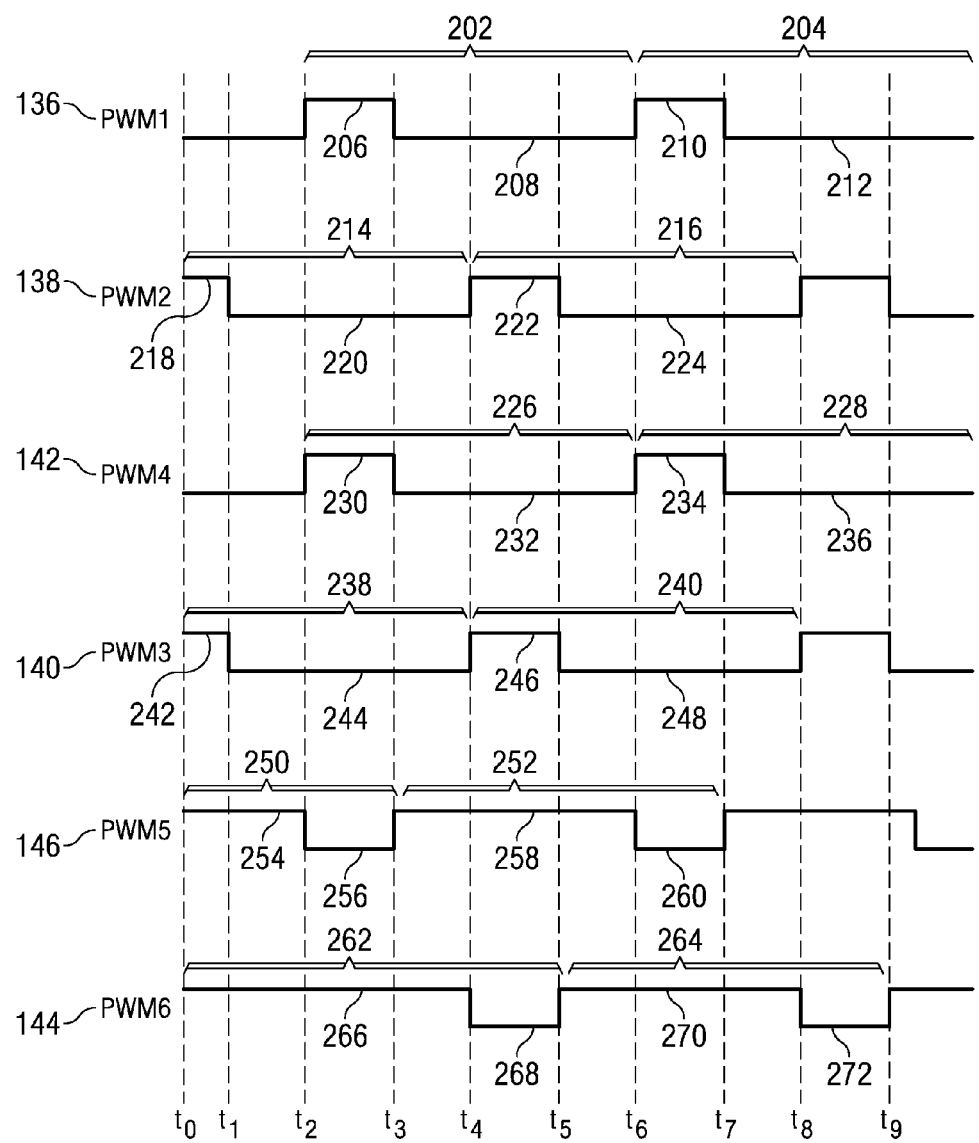
FIG. 2 is a timing diagram illustrating the state of each control signal of the conventional DC/DC full bridge converter of FIG. 1A during the first operational state and FIG. 1B during the second operational state.
Figure 3:
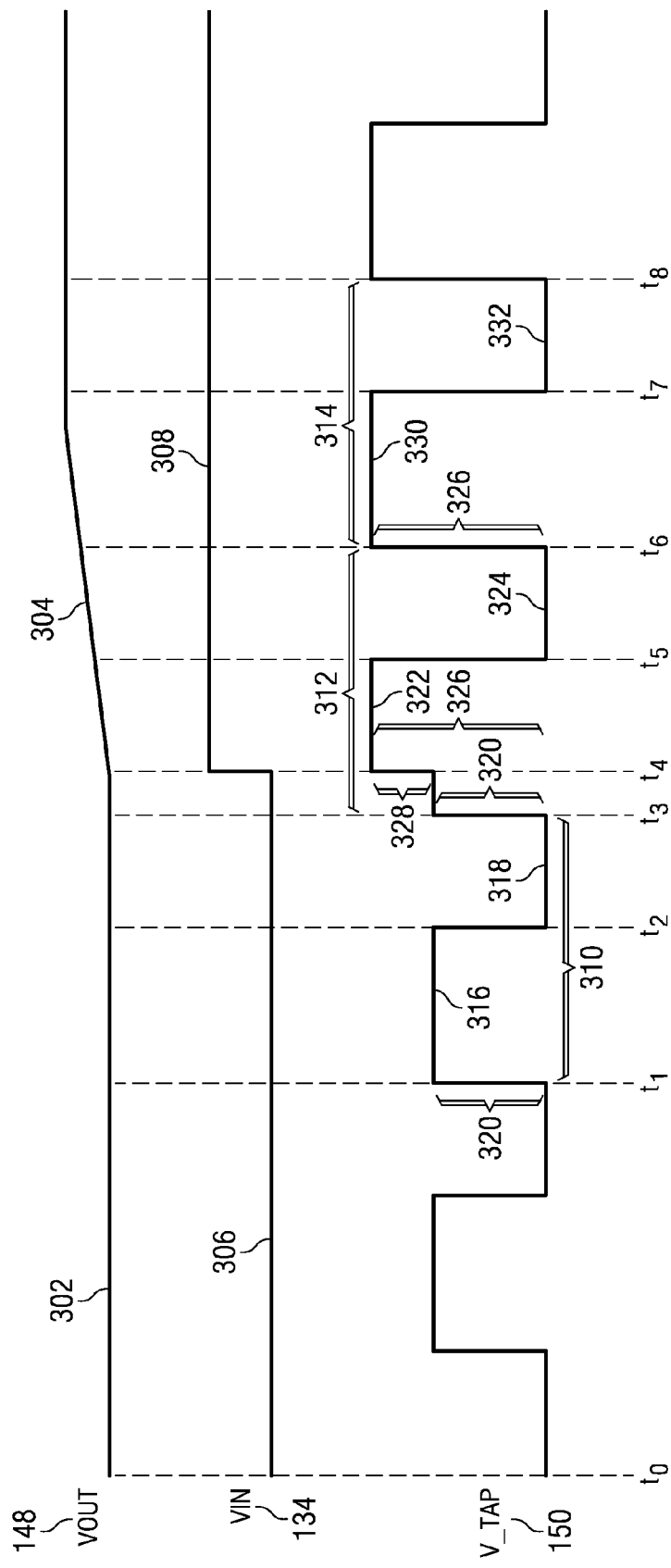
FIG. 3 is a timing diagram illustrating an output voltage overshoot scenario experienced by the conventional DC/DC full bridge converter of FIG. 1A and FIG. 1B.
Figure 4:
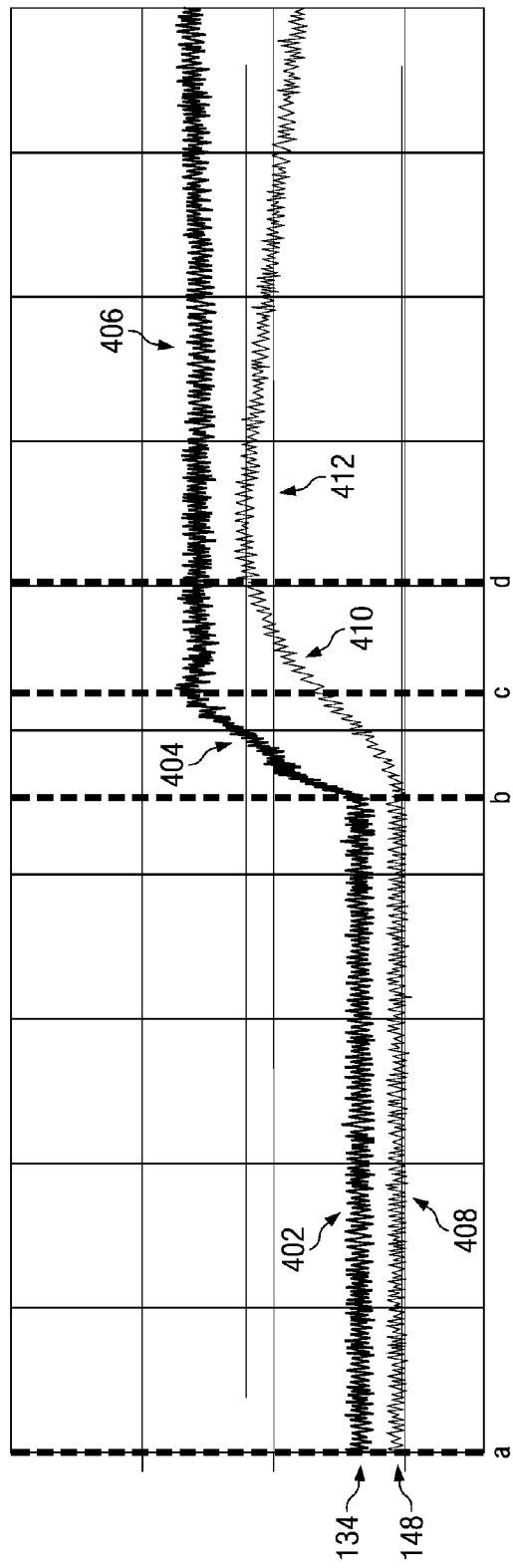
FIG. 4 is a wave diagram illustrating an output voltage overshot scenario experienced by the conventional DC/DC full bridge converter of FIG. 1A and FIG. 1B.
Figure 5A:
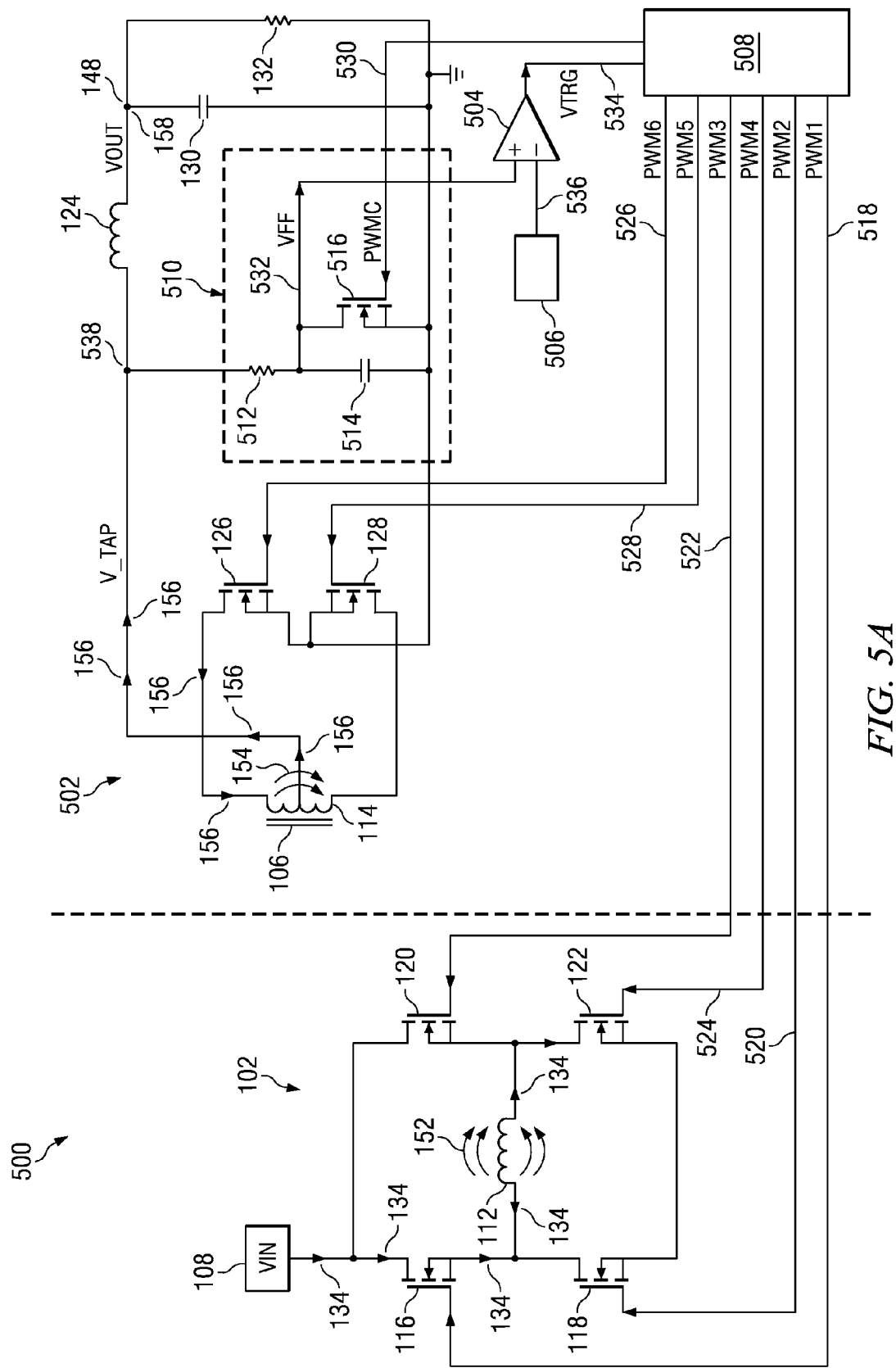
FIG. 5A illustrates a DC/DC full bridge converter during a first operational state in accordance with the present invention.
Figure 5B:
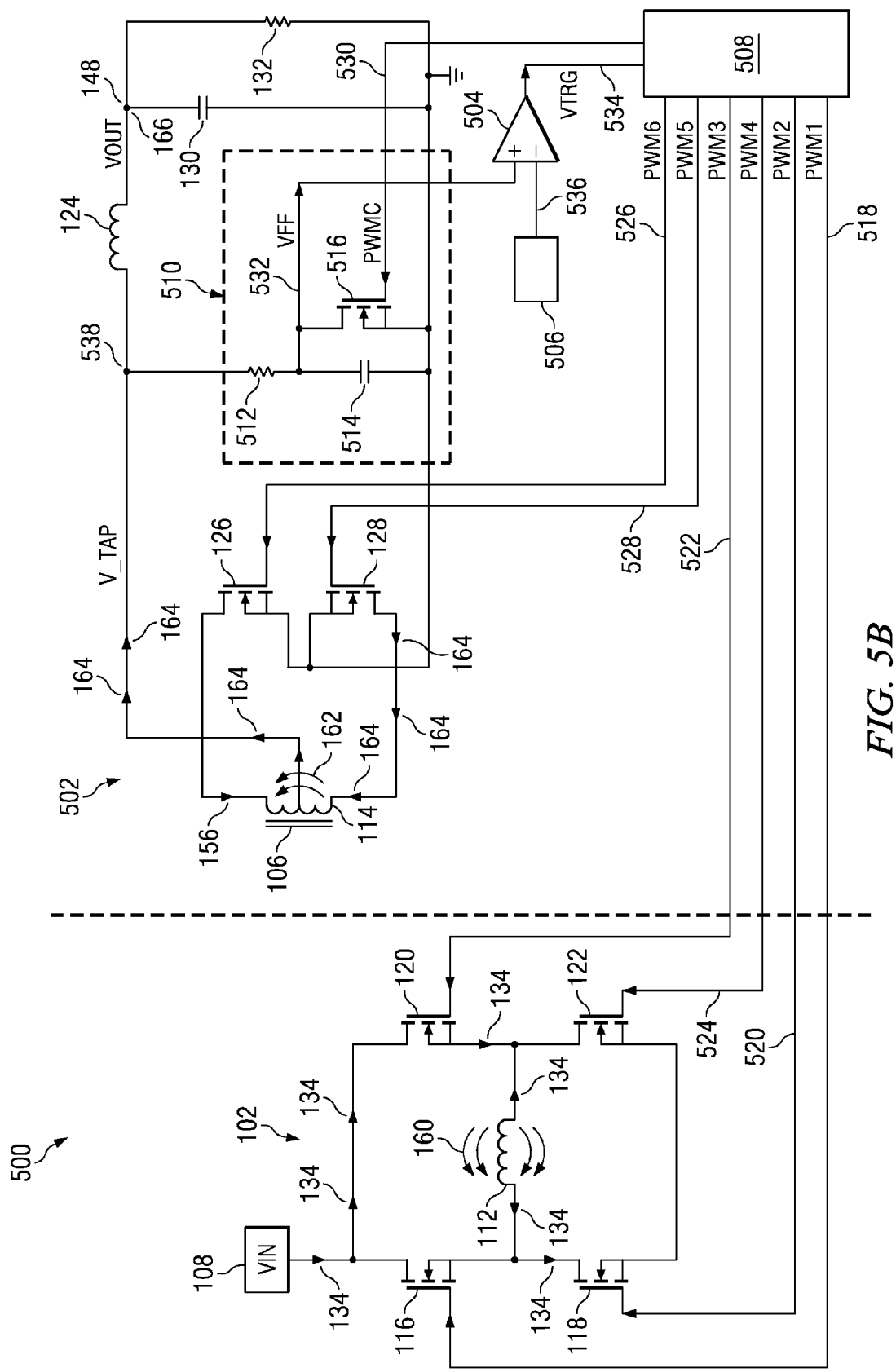
FIG. 5B illustrates a DC/DC full bridge converter during a second operational state in accordance with the present invention.

FIGS. 5A-B illustrates an example DC/DC full bridge converter 500 in accordance with an aspect of the present invention. FIG. 5A illustrates DC/DC full bridge converter 500 during a first operational state. FIG. 5B illustrates a DC/DC full bridge converter 500 during a second operational state.

As illustrated in FIG. 5A, DC/DC full bridge converter 500 includes primary side 102, a secondary side 502, transformer 106, DC input signal provider 108. Secondary side 502 includes a feedback signal generator 504, a threshold voltage provider 506 and a control signal generator 508, an input voltage sensing circuit 510, secondary side winding 114, inductor 124, secondary side switches 126 and 128, capacitor 130 and resistive load 132. Input voltage sensing circuit 510 includes a resistor 512, a capacitor 514, and a secondary side switch 516.

DC input signal provider 108 is arranged to provide an input signal 134 to primary side 102. Control signal generator 508 is arranged to provide primary side control signals 518, 520, 522 and 524 to primary side switches 116, 118, 120 and 122, respectively. Control signal generator 508 is additionally arranged to provide secondary side control signals 526, 528, and 530 to secondary side switches 126, 128, and 516 respectively. Transformer 106 is situated between primary side 102 and secondary side 502.

Input voltage sensing circuit 510 is connected to secondary side winding 114 and is arranged to provide a surge voltage 532 to feedback generator 504. Resistor 512 is connected in series with capacitor 514 and secondary side switch 516. Capacitor 514 is connected in parallel with secondary side switch 516. Control signal generator 508 is additionally arranged to receive a feedback signal 534 from feedback signal generator 504. Feedback signal generator 504 is arranged to receive surge voltage 532 from input voltage sensing circuit 510 and a threshold voltage 536 from threshold voltage provider 506.

Threshold voltage provider 506 is a voltage source that provides threshold voltage 536. Feedback signal generator 504 is operable to generate feedback signal 534 based on threshold voltage 536 and surge voltage 532. In an example embodiment, feedback signal generator 504 is a comparator, wherein feedback signal 534 is based on a comparison between threshold voltage 536 and surge voltage 532. Feedback signal generator 504 may be any type of comparator known in the art.

Input voltage sensing circuit 510 senses a center-tap voltage 538 of secondary winding 114.

In a non-limiting example embodiment, primary side control signals 518, 520, 522 and 524 and secondary side control signals 526, 528, and 530 are pulse-width modulated control signals. In other non-limiting example embodiments, primary side control signals 518, 520, 522 and 524 and secondary side control signals 526, 528, and 530 may be any known pulse controlled signals, non-limiting examples of which include pulse-amplitude modulated control signals and pulse-number modulated control signals.

In operation through the first and second operational states, DC/DC full bridge converter 500 receives input signal 134 in the form of direct current (DC) as input. Input signal 134 has an associated voltage level that is too high to drive resistive load 132. DC/DC full bridge converter 500 produces output voltage 148, which has a lower associated voltage level than the associated voltage level of input signal 134, to drive resistive load 132 while maintaining direct current.

During the first operational state as shown in FIG. 5A, control signal generator 508 transmits primary side control signals 518, 524, and secondary side control signal 526 to turn on primary side switches 116, 122, and secondary side switch 126 respectively. At the same time, control signal generator 508 transmits primary side control signals 520, 522 and secondary side control signals 528, 530 to turn off primary side switches 118, 120, and secondary side switches 128, 516 respectively.

The switching on of primary side switches 116 and 122 allows input signal 134 to travel through them as current, thus applying input signal 134 as voltage across primary side winding 112 and inducing magnetic field 152. Correspondingly, positive magnetic field 154 is induced in secondary side winding 114. Positive magnetic field 154 generates current 156 travelling through secondary side switch 126 to produce first output voltage 158 at the end of the first operational state.

During the second operational state as shown in FIG. 5B, control signal generator 508 transmits primary side control signals 518, 524, and secondary side control signals 526, 530 to turn off primary side switches 116, 122, and secondary side switches 126, 516 respectively. At the same time, control signal generator 508 transmits primary side control signals 520, 522 and secondary side control signal 528 to turn on primary side switches 118, 120 and secondary side switch 128 respectively.

The switching on of primary side switches 118 and 120 allows input signal 134 to travel through them as current, thus applying input signal 134 as voltage across primary side winding 112 and inducing magnetic field 160 that has an opposite direction as magnetic field 152. Correspondingly, negative magnetic field 162 is induced in secondary side winding 114. Negative magnetic field 162 generates current 164 travelling through secondary side switch 128 to produce second output voltage 166.

When transitioning from the first operational state to the second operational state or vice versa, control signal generator 508 transmits secondary side control signal 530 to turn on secondary side switch 516 while primary side switches 116, 118, 120, 122 are off during this transitional period. Thus, the voltage charged by current 156 and 164 is reset to zero. During the first and second operational state, secondary side switch 516 is off. Current 156 and 164 charge capacitor 514 to generate surge voltage 532. Surge voltage 532 corresponds to the amount of output voltage overshoot output voltage 148 will experience.

Feedback signal generator 504 then obtains surge voltage 532 and threshold voltage 536 from input voltage sensing circuit 510 and threshold voltage provider 506, respectively. Threshold voltage 536 is a predetermined acceptable threshold amount of output voltage overshoot. Feedback signal generator 504 compares surge voltage 532 and threshold voltage 536. If surge voltage 532 is greater than threshold voltage 536, feedback signal generator 504 transmits feedback signal 534 to control signal generator 508. When control signal generator 508 receives feedback signal 534, control signal generator 508 modifies at least one of primary side control signals 518, 520, 522, and 524 and secondary side control signals 526, 528, and 530 based on feedback signal 534. This constant monitoring by Feedback signal generator 504 ensures there will not a large voltage overshoot in output voltage 148 if input signal 134 experiences a rapid increase in voltage level.

In the end, first output voltage 158 and second output voltage 166 combine to produce output voltage 148. Output voltage 148 has an associated voltage level that is appropriate to drive resistive load 132, but lower than the associated voltage magnitude of input signal 134. Feedback signal generator 504 compares surge voltage 532 and threshold voltage 536 during the first and second operational state to prevent large voltage overshoot in Output voltage 148. This will be further described with additional reference in FIGS. 6-9 below.

Figure 6:
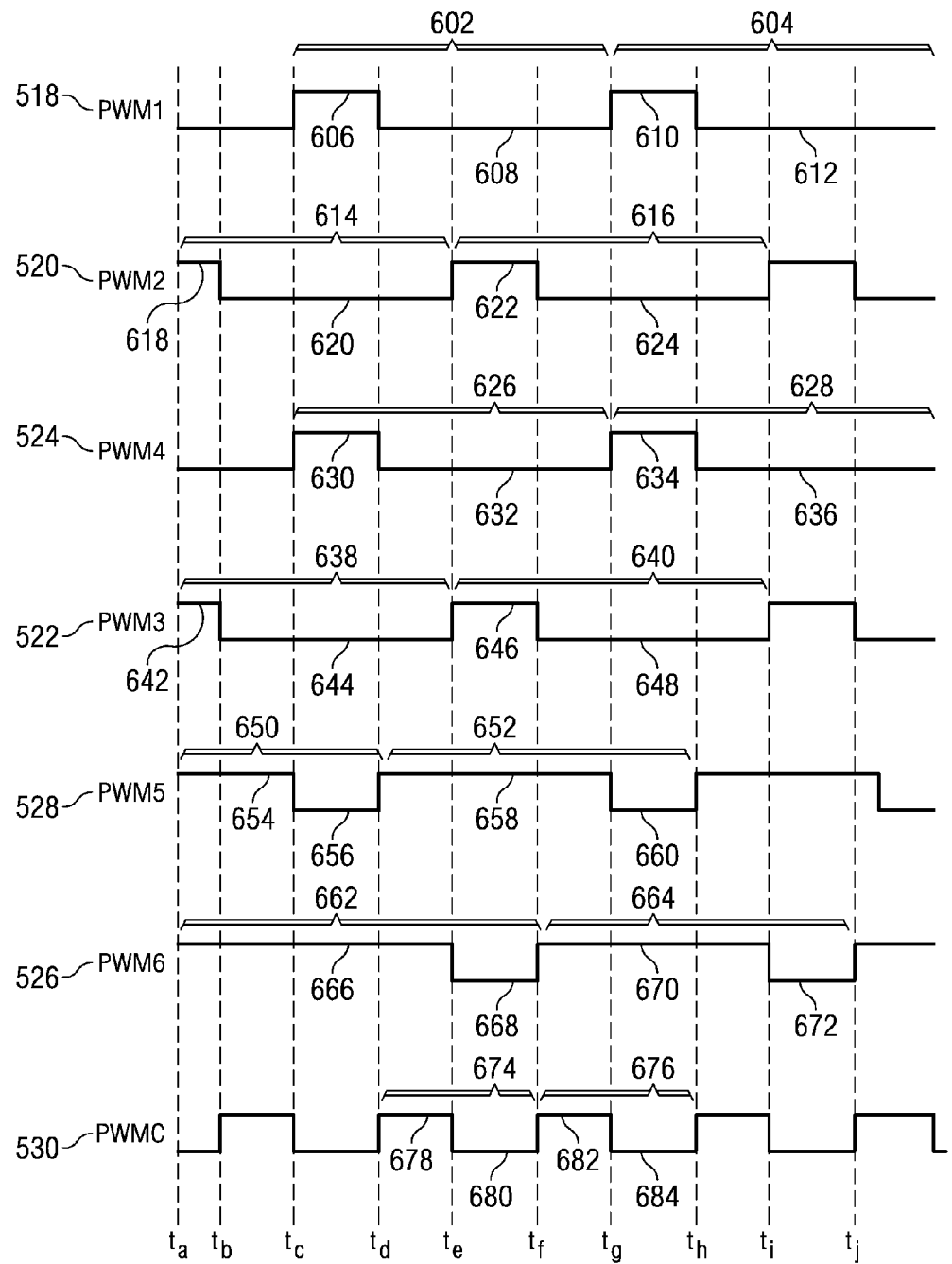
FIG. 6 is a timing diagram illustrating the state of each switch driving signal of the DC/DC full bridge converter of FIG. 5A during the first operational state and FIG. 5B during the second operational state in accordance with the present invention.

FIG. 6 is a timing diagram illustrating the state of primary side control signals 518, 520, 522 and 524 and secondary side control signals 526, 528 and 530 of DC/DC full bridge converter 500 during a first and a second operational state.

The figure includes examples of primary side control signals 518, 520, 522 and 524 and secondary side control signals 526, 528 and 530.

Primary side control signal 518 includes a period 602 and a partial period 604. Period 602 includes an on state voltage portion 606 from a time $t_c$ to a time $t_d$ and an off state voltage portion 608 from time $t_d$ to a time $t_g$. Partial period 604 includes an on state voltage portion 610 from time $t_g$ to a time $t_h$ and an off state voltage portion 612 from time $t_h$ forward.

Primary side control signal 520 includes a partial period 614 and a period 616. Partial period 614 includes an on state voltage portion 618 from a time $t_a$ to a time $t_b$ and an off state voltage portion 620 from time $t_b$ to a time $t_o$. Period 216 includes an on state voltage portion 222 from time $t_o$ to a time $t_f$ and an off state voltage portion 224 from time $t_f$ to a time $t_i$.

Primary side control signal 524 includes a period 626 and a partial period 628. Period 626 includes an on state voltage portion 630 from time $t_c$ to time $t_d$ and an off state voltage portion 632 from time $t_d$ to time $t_g$. Partial period 628 includes an on state voltage portion 634 from time it to time $t_g$ and an off state voltage portion 636 from time $t_h$ forward.

Primary side control signal 522 includes a partial period 638 and a period 640. Partial period 638 includes an on state voltage portion 642 from time $t_b$ to time $t_c$ and an off state voltage portion 644 from time $t_b$ to time $t_c$. Period 640 includes an on state voltage portion 646 from time $t_e$ to time $t_f$ and an off state voltage portion 648 from time $t_f$ to time $t_i$.

Secondary side control signal 528 includes a partial period 650 and a period 652. Partial period 650 includes an on state voltage portion 654 from time $t_a$ to time $t_c$ and an off state voltage portion 656 from time $t_c$ to time $t_d$. Period 652 includes an on state voltage portion 658 from time $t_d$ to time $t_g$ and an off state voltage portion 660 from time $t_g$ to time $t_h$.

Secondary side control signal 526 includes a partial period 662 and a period 664. Partial period 662 includes an on state voltage portion 666 from time $t_a$ to time $t_e$ and an off state voltage portion 668 from time $t_e$ to time $t_f$. Period 664 includes an on state voltage portion 670 from time $t_f$ to time $t_i$ and an off state voltage portion 672 from time $t_i$ to a time $t_j$.

Secondary side control signal 530 includes a pulse 674 and a pulse 676. Pulse 674 includes an on state voltage portion 678 from time $t_b$ to time $t_c$ and an off state voltage portion 680 from time $t_c$ to time $t_d$. Pulse 676 includes an on state voltage portion 682 from time $t_b$ to time $t_c$ and an off state voltage portion 684 from time $t_c$ to time $t_d$.

In operation, primary side control signals 518, 524, and secondary side control signal 526 have switching frequencies such that primary side switches 116, 122, and secondary side switch 126 are on together. In a non-limiting example embodiment, on state voltage portions 606, 630, 666 overlap from time $t_c$ to time $t_d$, similarly, on state voltage portions 610, 634, and 670 overlap from time $t_g$ time $t_h$. As a result, primary side switches 116, 122, and secondary side switch 126 are on together from time $t_c$ to time $t_d$ and time $t_g$ to time $t_h$.

Figure 7:
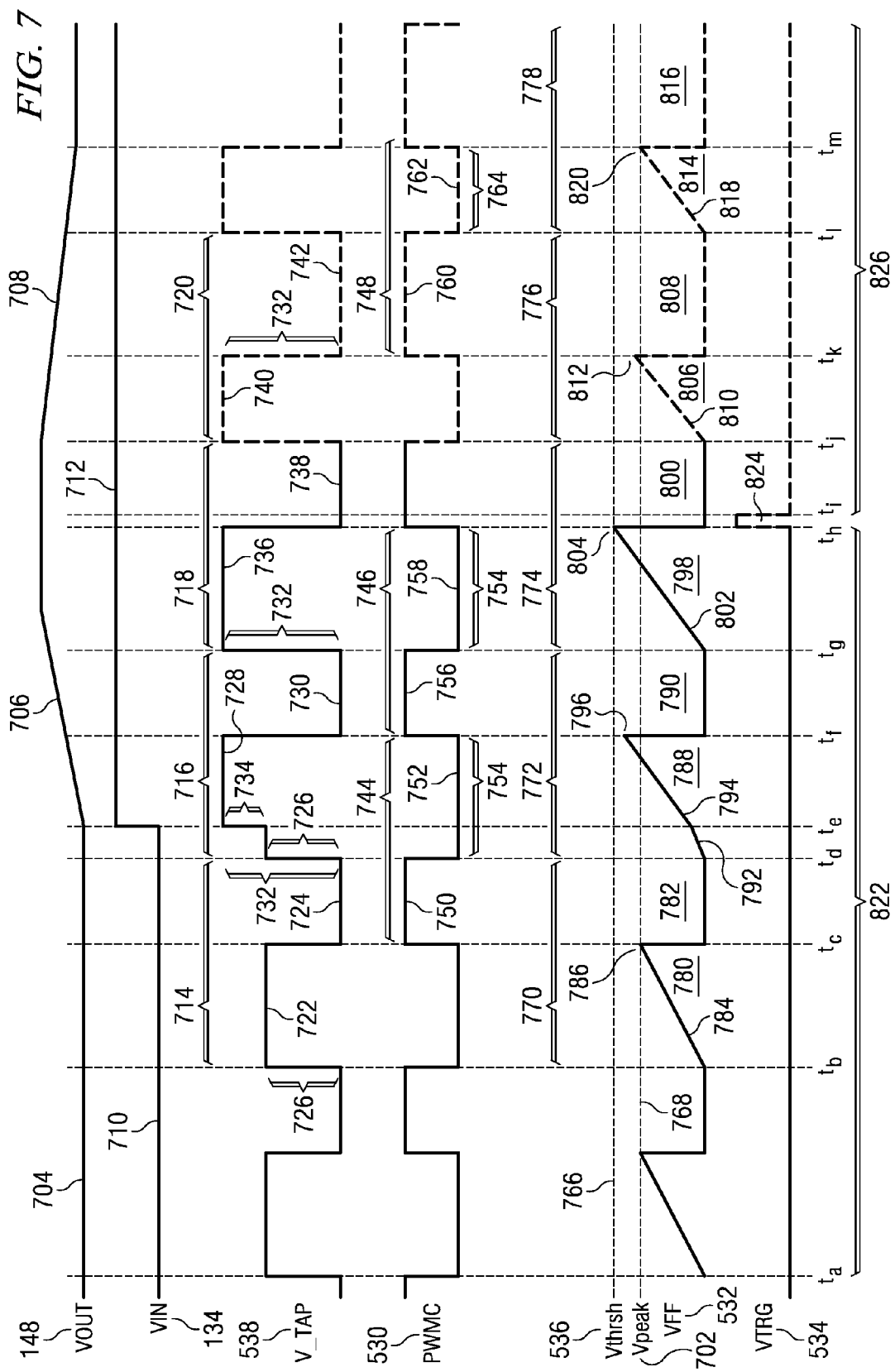
FIG. 7 is a timing diagram illustrating an output voltage overshoot scenario experienced by the DC/DC full bridge converter of FIG. 5A and FIG. 5B in accordance with the present invention.

FIG. 7 is a timing diagram illustrating an output voltage overshoot scenario experienced by DC/DC full bridge converter 500.

The figure includes examples of output voltage 148, input signal 134, center-tap voltage 538, secondary side control signal 530, threshold voltage 536, a peak voltage level 702, surge voltage 532, and feedback signal 534.

Output voltage 148 includes a stable portion 704 from a time $T_a$ to a time $T_c$, an overshoot portion 706 from time $T_c$ to a time $t_j$, and a post overshoot portion 708 from time $T_j$ forward. Input signal 134 includes a low portion 710 from time $T_a$ to a time $T_c$ and a high portion 712 from time $T_e$ forward.

Center-tap voltage 538 includes pulse 714, pulse 716, pulse 718, and pulse 720. Pulse 714 includes an on state voltage portion 722 from a time $T_b$ to a time $T_c$, an off state voltage portion 724 from time $T_c$ to a time $T_d$, and an amplitude 726. Pulse 716 includes an on state voltage portion 728 from time $T_d$ to a time $T_f$, an off state voltage portion 730 from time $T_f$ to a time $T_g$, and an amplitude 732. Amplitude 732 includes amplitude 726 and an increased portion 734.

Pulse 718 includes an on state portion 736 from time $T_g$ to a time $T_h$, an off state portion 738 from time $T_h$ to a time $T_j$, and amplitude 732. Pulse 720 includes an on state portion 740 from time $T_j$ to a time $T_k$, an off state portion 742 from time $T_k$ to a time $T_1$, and amplitude 732.

Secondary side control signal 530 includes a pulse 744, a pulse 746, a pulse 748. Pulse 744 includes an on state voltage portion 750 from time $T_c$ to time $T_d$, an off state voltage portion 752 from time $T_d$ to time $T_f$, a pulse width 754. Pulse 746 includes an on state voltage portion 756 from time $T_f$ to time $T_g$, an off state voltage portion 752 from time $T_d$ to time $T_f$, pulse width 754. Pulse 748 includes an on state voltage portion 760 from time $T_k$ to time $T_1$, an off state voltage portion 762 from time $T_1$ to time $T_m$, and a pulse width 764.

Threshold voltage 536 includes a voltage level 766. Peak voltage 702 includes a voltage level 768.

Surge voltage 532 includes a pulse 770, a pulse 772, a pulse 774, a pulse 776, a pulse 778. Pulse 770 includes an on state voltage, portion 780 from time $T_b$ to time $T_c$ and an off state voltage portion 782 from time $T_c$ to time $T_d$. On state voltage portion 780 includes a slope 784 and a peak 786 at time $T_c$. Pulse 772 includes an on state voltage portion 788 from time $T_d$ to time $T_f$ and an off state voltage portion 790 from time $T_f$ to time $T_g$. On state voltage portion 788 includes a first slope 792 from time $T_d$ to time $T_e$, a second slope 794 from time $T_e$ to time $T_f$, and a peak 796 at time $T_f$.

Pulse 774 includes an on state voltage portion 798 from time $T_g$ to time $T_h$ and an off state voltage portion 800 from time $T_h$ to time $T_j$. On state voltage portion 798 includes a slope 802 and a peak 804 at time $T_h$. Pulse 776 includes an on state voltage portion 806 from time $T_j$ to time $T_k$ and an off state voltage portion 808 from time $T_k$ to time $T_l$. On state voltage portion 806 includes a slope 810 and a peak 812 at time $T_k$. Pulse 778 includes an on state voltage portion 814 from time $T_l$ to time $T_m$ and an off state voltage portion 816 from time $T_m$ forward. On state voltage portion 814 includes a slope 818 and a peak 820 at time $T_m$.

Feedback signal 534 includes a first off portion 822 from time $T_a$ to time $T_h$, an on pulse 824 from time $T_h$ to time $T_i$, and a second off portion 826 from time $T_i$ forward.

In operation, when input signal 134 experiences a rapid increase in voltage at time $T_e$, input signal 134 transitions from low portion 710 to high portion 712. Output voltage 148 experiences an overshoot in voltage value as it transitions from stable portion 704 to overshoot portion 706. Center-tap voltage 538 also experiences an increase in voltage as amplitude 732 has a higher value than amplitude 726. Increased portion 734 corresponds to the rapid increase of input signal 134.

Input voltage sensing circuit 510 senses the increase in voltage of center-tap voltage 538 and causes surge voltage 532 to increase in voltage as well. The increase in voltage of center-tap voltage 538 is due to the increase in charging current to resistor 512 while charging cycle remains the unchanged.

Slopes 784 and 802, first slope 792, second slope 794 represent the rates capacitor 514 is charged at different times. Prior to input signal 134 experiences the rapid increase, capacitor 514 is charged at a rate equal to slope 784, resulting in surge voltage 532 having a voltage value at peak 786, equal to voltage level 768 of peak voltage 702 from time $T_b$ to time $T_c$. When input signal 134 experiences the rapid increase at time $T_e$, capacitor 514 is charged at a rate equal to the sum of slope 792 and slope 794, resulting in surge voltage 532 having a higher voltage value at peak 796 than peak 786 from time $T_d$ to time $T_f$. Peak 796 is still not greater than threshold voltage 536, thus feedback signal generator 504 does not transmit feedback signal 534 to control signal generator 508.

At the next charging cycle from time $T_g$ to time $t_h$, capacitor 514 is charged at a rate equal to slope 802, which is even faster than the sum of first slope 792 and second slope 794 at the previous charging cycle from time $T_d$ to time $T_f$. The resulting voltage value of surge voltage 532 is higher than threshold voltage 536, as peak 804 is above voltage level 766 of threshold voltage 536 at time $T_h$.

At time $T_h$, Feedback signal generator 504 detects that surge voltage 532 has a greater voltage value than peak voltage 702 and transmits feedback signal 534 to control signal generator 508 as shown by pulse 824. Based on feedback signal 534, at the next charging cycle, control signal generator 508 modifies secondary side control signal 530 by reducing pulse width of off state voltage portion 762 as shown by pulse 748. As a result, pulse width 764 is reduced relative to pulse width 754.

Control signal generator 508 also modifies at least one of primary side control signals 518, 520, 522, 524 and secondary side control signals 526, 528 by reducing their respective pulse widths (not shown). The reduction in pulse width causes the respective duty cycles of primary side switches 116, 118, 120, 122 and secondary side switches 126, 128 to be reduced.

At time $T_j$, primary side switches 116, 118, 120, 122 and secondary side switches 126, 128, 516 are switched on or off based on primary side control signals 518, 520, 522, 524 and secondary side control signals 526, 528, 530 as modified by control signal generator 508, respectively. The reduction in pulse width of primary side control signals 518, 520, 522, 524 and secondary side control signals 526, 528, 530 causes less amount of current to travel through resistive load 132, which lowers the voltage value of output voltage 148.

As a result, the overshoot of output voltage 148 is reduced as overshoot portion 706 transitions to post overshoot portion 708. The voltage value of surge voltage 532 is also reduced as shown by peaks 812 and 820. At time $T_k$, peak 812 is below voltage level 766 of threshold voltage 536 but above voltage level 768 of peak voltage 702. At time $T_m$, peak 820 is level with voltage level 768 of peak voltage 702.

In another non-limiting example embodiment, control signal generator 508 may truncate the pulse width of at least one of primary side control signals 518, 520, 522, 524 and secondary side control signals 526, 528, 530 based on feedback signal 534 cycle by cycle to reduce the overshoot of output voltage 148.

In a further non-limiting example embodiment, primary side control signals 518, 520, 522 and 524 and secondary side control signals 526, 528, and 530 may be pulse-amplitude modulated control signals. Control signal generator 508 may modify the respective pulse-amplitude of primary side control signals 518, 520, 522 and 524 and secondary side control signals 526, 528, and 530 based on feedback signal 534 to reduce the overshoot of output voltage 148.

In another further non-limiting example embodiment, primary side control signals 518, 520, 522 and 524 and secondary side control signals 526, 528, and 530 may be pulse-number modulated control signals. Control signal generator 508 may modify the respective pulse number of primary side control signals 518, 520, 522 and 524 and secondary side control signals 526, 528, and 530 based on feedback signal 534 to reduce the overshoot of output voltage 148.

Figure 8:
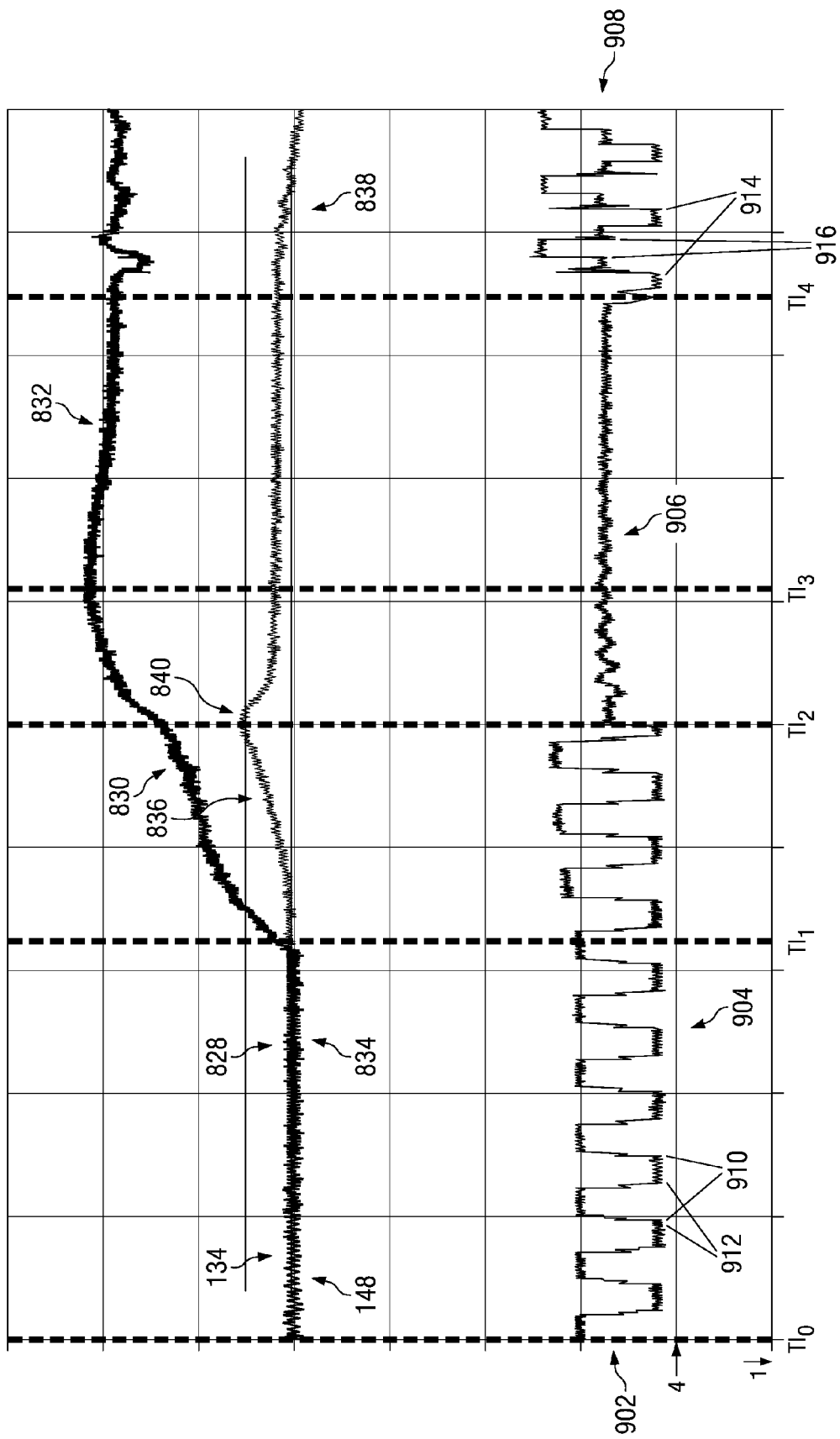
FIG. 8 is a timing diagram illustrating an output voltage overshoot scenario experienced by the DC/DC full bridge converter of FIG. 5A and FIG. 5B in accordance with the present invention.

FIG. 8 is a wave diagram illustrating the output voltage overshoot scenario experienced by DC/DC full bridge converter 500.

The figure includes examples of input signal 134 and output voltage 148.

Input signal 134 includes a low portion 828 from a time $TI_0$ to a time $TI_1$, a surge portion 830 from a time $TI_1$ to a time $TI_3$, and a high portion 832 from time $TI_3$ forward. Output voltage 148 includes a low portion 834 from time $TI_0$ to time $TI_1$, an overshoot portion 836 from time $TI_1$ to time $TI_3$, a recovery portion 838 from time $TI_3$ forward. Overshoot portion includes a peak 840 at a time $TI_2$.

In a non-limiting example, input signal 134 has a voltage value of 40 volts in low portion 828 and output voltage 148 has a voltage value of 12 volts in low portion 834. When input signal 134 increases rapidly from 40 volts in low portion 828 to 61 volts in high portion 832 through surge portion 830, output voltage 148 experiences an overshoot of just 0.96 volts in overshoot portion 836 from time $TI_1$ to time $TI_3$ after control signal generator 508 modifies the pulse width of at least one of primary side control signals 518, 520, 522, 524 and secondary side control signals 526, 528, 530 based on feedback signal 534. Output voltage 148 then gradually decreases back to 12 volts in recovery portion 838 from time $TI_3$ forward.

Thus, the amount of overshoot in DC/DC full bridge converter 500 is substantially less than the amount of overshoot output voltage 148 would have experienced in conventional DC/DC full bridge converter 100. In a non-limiting example, when input signal 134 increases from 44 volts to 56 volts, the amount of overshoot experienced by output voltage 148 in conventional DC/DC full bridge converter 100 is 2.32 volts. In contrast, the amount of overshoot experienced by output voltage 148 in DC/DC full bridge converter 500 is only 0.96 volts when input signal 134 increases from 40 volts to 61 volts.

Figure 9:
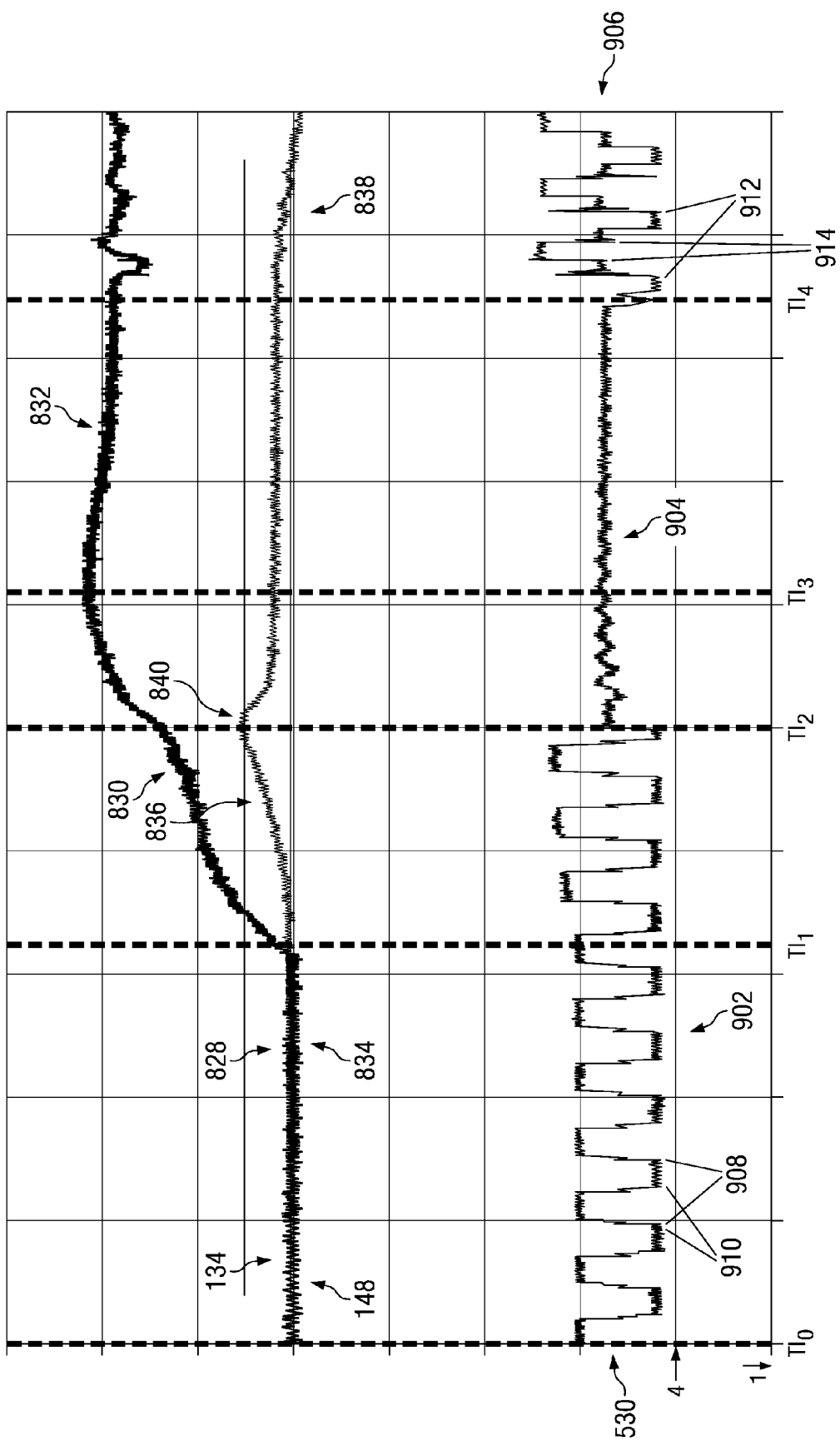
FIG. 9 is a partially enlarged view of the output voltage overshoot scenario as shown in FIG. 8.

FIG. 9 is a partially enlarged view of the output voltage overshoot scenario as shown in FIG. 8.

The figure includes examples of input signal 134, output voltage 148 as shown in FIG. 8, and primary side switching node voltage 902.

Switching node voltage 902 is voltage between primary side switches 116 and 118. Switching node voltage 902 includes a pre-adjustment portion 904 from time $TI_0$ to time $TI_2$, a reset portion from 906 from time $TI_2$ to a time $TI_4$, a post-adjustment portion 908 from time 771 forward. Pre-adjustment portion 904 includes a pulse 910. Pulse 910 includes a pulse width 912. Post-adjustment portion includes a pulse 914. Pulse 914 includes a pulse width 916.

Prior to control signal generator 508 receiving feedback signal 534 at time $TI_2$, each pulse of Switching node voltage 902 has a pulse width equal to pulse width 912 as shown by pulse 910. At time $TI_2$, control signal generator 508 modifies primary side control signal 518 based on feedback signal 534 and transmits it back to primary side switch 116 as pulse 914. Pulse width 916 of Pulse 914 is reduced relative to pulse width 912 to reduce the overshoot experienced by output voltage 148 to be below the acceptable threshold level.

As noted in FIGS. 5A-9, feedback signal generator 504 compares surge voltage 532, the amount of output voltage overshoot, to threshold voltage 536, the predetermined acceptable threshold level, to reduce the amount of output voltage overshoot. If surge voltage 532 is greater than threshold voltage 536, feedback signal generator 504 sends feedback signal 534 to control signal generator 508. Control signal generator 508 then modifies at least one of primary side control signals 518, 520, 524, 522 and secondary side control signals 526, 528, 530 to decrease the amount of output voltage overshoot, thus overcoming the problem of large output voltage overshoot associated with the prior art.

DC/DC full bridge converter 500 ensures that the amount of output voltage overshoot is controlled, thus preventing, or limiting, potential damages to any loads driven by output voltage 148.

The foregoing description of various preferred embodiments of the invention have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. A DC/DC converter for use with a DC input signal and a load, said DC/DC converter comprising:
 a control signal generator operable to generate a first primary side control signal, a second primary side control signal, a first secondary side control signal, a second secondary side control signal and a third secondary side control signal;
 a primary side winding;
 a first primary side switch operable to pass, based on the first primary side control signal, the DC input signal through said primary side winding in a positive direction to generate a first magnetic field;
 a second primary side switch operable to pass, based on the second primary side control signal, the DC input signal through said primary side winding in a negative direction to generate a second magnetic field;
 a secondary side winding coupled with said primary side winding, said secondary side winding being operable to generate a first current in the positive direction based on the first magnetic field and to generate a second current in the negative direction based on the second magnetic field;
 a first secondary side switch operable to pass the first current to the load based on the first secondary side control signal;
 a second secondary side switch operable to pass the second current to the load based on the second secondary side control signal;
 a voltage generating portion operable to receive the first current and the second current and to generate a surge voltage based on the third secondary side control signal;
 a threshold voltage providing portion operable to generate a threshold voltage; and
 a feedback signal generator operable to generate a feedback signal based on the surge voltage and the threshold voltage,
 wherein said control signal generator is further operable to modify one of the first primary side control signal, the second primary side control signal, the first secondary side control signal, the second secondary side control signal and the third secondary side control signal based on the feedback signal.

2. The DC/DC converter of claim 1, wherein said feedback signal generator comprises a comparator operable to compare the surge voltage and the threshold voltage.

3. The DC/DC converter of claim 2, wherein said comparator is further operable to output a pulse as the feedback signal when the surge voltage is greater than the threshold voltage.

4. The DC/DC converter of claim 3,
 wherein said voltage generating portion comprises a resistor, a capacitor and a voltage generating switch,
 wherein said voltage generating switch is operable to be in a first state and a second state based on the third secondary side control signal,
 wherein when said voltage generating switch is in the first state, said capacitor is charged by one of the first current and the second current, and
 wherein when said voltage generating switch is in the second state, said capacitor is operable to discharge a stored charge through said resistor to generate the surge voltage.

5. The DC/DC converter of claim 4, wherein said control signal generator is further operable to generate the first primary side control signal as a first pulse-width modulated primary side control signal, to generate the second primary side control signal as a second pulse-width modulated primary side, control signal, to generate the first secondary side control signal as a first pulse-width modulated secondary side control signal, to generate the second secondary side control signal as a second pulse-width modulated secondary side control signal and to generate the third secondary side control signal as a third pulse-width modulated secondary side control.

6. The DC/DC converter of claim 5, wherein said control signal generator is further operable to modify the pulse width of one of the first pulse-width modulated primary side control signal, the second pulse-width modulated primary side control signal, the first pulse-width modulated secondary side control signal, the second pulse-width modulated secondary side control signal and the third pulse-width modulated secondary side control.

7. The DC/DC converter of claim 1,
 wherein said voltage generating portion comprises a resistor, a capacitor and a voltage generating switch,
 wherein said voltage generating switch is operable to be in a first state and a second state based on the third secondary side control signal,
 wherein when said voltage generating switch is in the first state, said capacitor is charged by one of the first current and the second current, and
 wherein when said voltage generating switch is in the second state, said capacitor is operable to discharge a stored charge through said resistor to generate the surge voltage.

8. The DC/DC converter of claim 7, wherein said control signal generator is further operable to generate the first primary side control signal as a first pulse-width modulated primary side control signal, to generate the second primary side control signal as a second pulse-width modulated primary side control signal, to generate the first secondary side control signal as a first pulse-width modulated secondary side control signal, to generate the second secondary side control signal as a second pulse-width modulated secondary side control signal and to generate the third secondary side control signal as a third pulse-width modulated secondary side control.

9. The DC/DC converter of claim 8, wherein said control signal generator is further operable to modify the pulse width of one of the first pulse-width modulated primary side control signal, the second pulse-width modulated primary side control signal, the first pulse-width modulated secondary side control signal, the second pulse-width modulated secondary side control signal and the third pulse-width modulated secondary side control.

10. The DC/DC converter of claim 1, wherein said control signal generator is further operable to generate the first primary side control signal as a first pulse-width modulated primary side control signal, to generate the second primary side control signal as a second pulse-width modulated primary side control signal, to generate the first secondary side control signal as a first pulse-width modulated secondary side control signal, to generate the second secondary side control signal as a second pulse-width modulated secondary side control signal and to generate the third secondary side control signal as a third pulse-width modulated secondary side control.

11. The DC/DC converter of claim 10, wherein said control signal generator is further operable to modify the pulse width of one of the first pulse-width modulated primary side control signal, the second pulse-width modulated primary side control signal, the first pulse-width modulated secondary side control signal, the second pulse-width modulated secondary side control signal and the third pulse-width modulated secondary side control.

12. A method of DC/DC converting a DC input signal for use with a load, said method comprising:
    generating, via a control signal generator, a first primary side control signal, a second primary side control signal, a first secondary side control signal, a second secondary side control signal and a third secondary side control signal;
    passing, via a first primary side switch and based on the first primary side control signal, the DC input signal through a primary side winding in a positive direction to generate a first magnetic field;
    passing, via a second primary side switch and based on the second primary side control signal, the DC input signal through the primary side winding in a negative direction to generate a second magnetic field;
    generating, via a secondary side winding coupled with the primary side winding, a first current in the positive direction based on the first magnetic field;
    generating, via the secondary side winding, a second current in the negative direction based on the second magnetic field;
    passing, via a first secondary side switch, the first current to the load based on the first secondary side control signal;
    passing, via a second secondary side switch, the second current to the load based on the second secondary side control signal;
    receiving, via a voltage generating portion, receive the first current and the second current;
    generating, via the voltage generating portion, a surge voltage based on the third secondary side control signal;
    generating, via a threshold voltage providing portion, a threshold voltage;
    generating, via a feedback signal generator, a feedback signal based on the surge voltage and the threshold voltage; and
    modifying, via the control signal generator, one of the first primary side control signal, the second primary side control signal, the first secondary side control signal, the second secondary side control signal and the third secondary side control signal based on the feedback signal.

13. The method of claim 12, wherein said generating, via a feedback signal generator, a feedback signal based on the surge voltage and the threshold voltage comprises comparing, via a comparator, the surge voltage and the threshold voltage.

14. The method of claim 13, wherein said comparing, via a comparator, the surge voltage and the threshold voltage comprises outputting, via the comparator, a pulse as the feedback signal when the surge voltage is greater than the threshold voltage.

15. The method of claim 14,
    wherein said generating, via the voltage generating portion, a surge voltage based on the third secondary side control signal comprises generating, via a resistor, a capacitor and a voltage generating switch, a surge voltage based on the third secondary side control signal,
    wherein the voltage generating switch is operable to be in a first state and a second state based on the third secondary side control signal,
    wherein when the voltage generating switch is in the first state, the capacitor is charged by one of the first current and the second current, and
    wherein when the voltage generating switch is in the second state, the capacitor is operable to discharge a stored charge through the resistor to generate the surge voltage.

16. The method of claim 15, wherein said generating, via a control signal generator, a first primary side control signal, a second primary side control signal, a first secondary side control signal, a second secondary side control signal and a third secondary side control signal comprises generating, via the control signal generator, the first primary side control signal as a first pulse-width modulated primary side control signal, generating, via the control signal generator, the second primary side control signal as a second pulse-width modulated primary side control signal, generating, via the control signal generator, the first secondary side control signal as a first pulse-width modulated secondary side control signal, generating, via the control signal generator, the second secondary side control signal as a second pulse-width modulated secondary side control signal and generating, via the control signal generator, the third secondary side control signal as a third pulse-width modulated secondary side control.

17. The method of claim 16, further comprising modifying, via the control signal generator, the pulse width of one of the first pulse-width modulated primary side control signal, the second pulse-width modulated primary side control signal, the first pulse-width modulated secondary side control signal, the second pulse-width modulated secondary side control signal and the third pulse-width modulated secondary side control.

18. The method of claim 12,
    wherein said generating, via the voltage generating portion, a surge voltage based on the third secondary side control signal comprises generating, via a resistor, a capacitor and a voltage generating switch, a surge voltage based on the third secondary side control signal,
    wherein the voltage generating switch is operable to be in a first state and a second state based on the third secondary side control signal,
    wherein when the voltage generating switch is in the first state, the capacitor is charged by one of the first current and the second current, and
    wherein when the voltage generating switch is in the second state, the capacitor is operable to discharge a stored charge through the resistor to generate the surge voltage.

19. The method of claim 12, wherein said generating, via a control signal generator, a first primary side control signal, a second primary side control signal, a first secondary side control signal, a second secondary side control signal and a third secondary side control signal comprises generating, via the control signal generator, the first primary side control signal as a first pulse-width modulated primary side control signal, generating, via the control signal generator, the second primary side control signal as a second pulse-width modulated primary side control signal, generating, via the control signal generator, the first secondary side control signal as a first pulse-width modulated secondary side control signal, generating, via the control signal generator, the second secondary side control signal as a second pulse-width modulated secondary side control signal and generating, via the control signal generator, the third secondary side control signal as a third pulse-width modulated secondary side control.

20. A DC/DC converter for use with a DC input signal and a load, said DC/DC converter comprising:

- a control signal generator operable to generate a first primary side control signal, a second primary side control signal, a first secondary side control signal, a second secondary side control signal and a third secondary side control signal;
- a primary side winding;
- a first primary side switch operable to pass, based on the first primary side control signal, the DC input signal through said primary side winding in a positive direction to generate a first magnetic field;
- a second primary side switch operable to pass, based on the second primary side control signal, the DC input signal through said primary side winding in a negative direction to generate a second magnetic field;
- a secondary side winding coupled with said primary side winding, said secondary side winding being operable to generate a first current in the positive direction based on the first magnetic field and to generate a second current in the negative direction based on the second magnetic field;
- a first secondary side switch operable to pass the first current to the load based on the first secondary side control signal;
- a second secondary side switch operable to pass the second current to the load based on the second secondary side control signal;
- a voltage generating portion operable to receive the first current and the second current and to generate a surge voltage based on the third secondary side control signal, said voltage generating portion comprising a resistor, a capacitor and a voltage generating switch, said voltage generating switch being operable to be in a first state and a second state based on the third secondary side control signal;
- a threshold voltage providing portion operable to generate a threshold voltage; and
- a feedback signal generator operable to generate a feedback signal based on the surge voltage and the threshold voltage, said feedback signal generator comprising a comparator operable to compare the surge voltage and the threshold voltage and to output a pulse as the feedback signal when the surge voltage is greater than the threshold voltage,
- wherein said control signal generator is further operable to modify one of the first primary side control signal, the second primary side control signal, the first secondary side control signal, the second secondary side control signal and the third secondary side control signal based on the feedback signal,
- wherein when said voltage generating switch is in the first state, said capacitor is charged by one of the first current and the second current,
- wherein when said voltage generating switch is in the second state, said capacitor is operable to discharge a stored charge through said resistor to generate the surge voltage,
- wherein said control signal generator is further operable to generate the first primary side control signal as a first pulse-width modulated primary side control signal, to generate the second primary side control signal as a second pulse-width modulated primary side control signal, to generate the first secondary side control signal as a first pulse-width modulated secondary side control signal, to generate the second secondary side control signal as a second pulse-width modulated secondary side control signal and to generate the third secondary side control signal as a third pulse-width modulated secondary side control,
- wherein said control signal generator is further operable to modify the pulse width of one of the first pulse-width modulated primary side control signal, the second pulse-width modulated primary side control signal, the first pulse-width modulated secondary side control signal, the second pulse-width modulated secondary side control signal and the third pulse-width modulated secondary side control, and
- wherein said first primary side switch comprises a field effect transistor.

\* \* \* \* \*